(12) United States Patent  
Gurney

(10) Patent No.: US 9,605,801 B2  
(45) Date of Patent: *Mar. 28, 2017

(54) LUBRICATING GREASE RETURN VALVE

(71) Applicant: GURTECH (PTY) LTD, Howick, Kwa Zulu Natal (ZA)

(72) Inventor: Richard Stillard Gurney, Kwa Zulu Natal (ZA)

(73) Assignee: GURTECH (PTY) LTD, Kwazulu Natal (ZA)

( * ) Notice: Subject to any disclaimer, the term of this patent is extended or adjusted under 35 U.S.C. 154(b) by 34 days.

This patent is subject to a terminal disclaimer.

(21) Appl. No.: 14/645,663

(22) Filed: Mar. 12, 2015

(65) Prior Publication Data

US 2015/0184801 A1      Jul. 2, 2015

Related U.S. Application Data

(62) Division of application No. 13/266,934, filed as application No. PCT/ZA2009/000034 on Apr. 28, 2009.

(51) Int. Cl.  
*F16N 3/12* (2006.01)  
*F16K 15/18* (2006.01)

(52) U.S. Cl.  
CPC .............. *F16N 3/12* (2013.01); *F16K 15/183* (2013.01); *Y10T 137/7904* (2015.04)

(58) Field of Classification Search  
CPC ........................................................ F16N 3/12  
USPC .... 184/105.2, 105.1; 222/397, 340; 137/528  
See application file for complete search history.

(56) References Cited

U.S. PATENT DOCUMENTS 4,062,425 A * 12/1977 O'Dell et al. ............. 184/105.2  
4,219,131 A *  8/1980 Funderburgh ..................... 222/1  
2006/0219482 A1* 10/2006 Tung ........................... 184/105.2

FOREIGN PATENT DOCUMENTS

DE       102 37 455      2/2004  
EP        0 242 145     10/1987

* cited by examiner

*Primary Examiner* — David E Sosnowski  
*Assistant Examiner* — Mark K Buse  
(74) *Attorney, Agent, or Firm* — Young & Thompson

(57) ABSTRACT

An apparatus for the relief of grease under pressure in the delivery line of grease guns and similar pressure delivery devices includes a 3-port valve in which the relief port is located between the delivery and inlet ports and includes a one way flow control valve mounted therein. The one way flow control valve is maintained in a closed position by the pressure of the grease and is activated to be opened to reduce the pressure in the valve body and allow the grease to return to the grease reservoir.

20 Claims, 2 Drawing Sheets

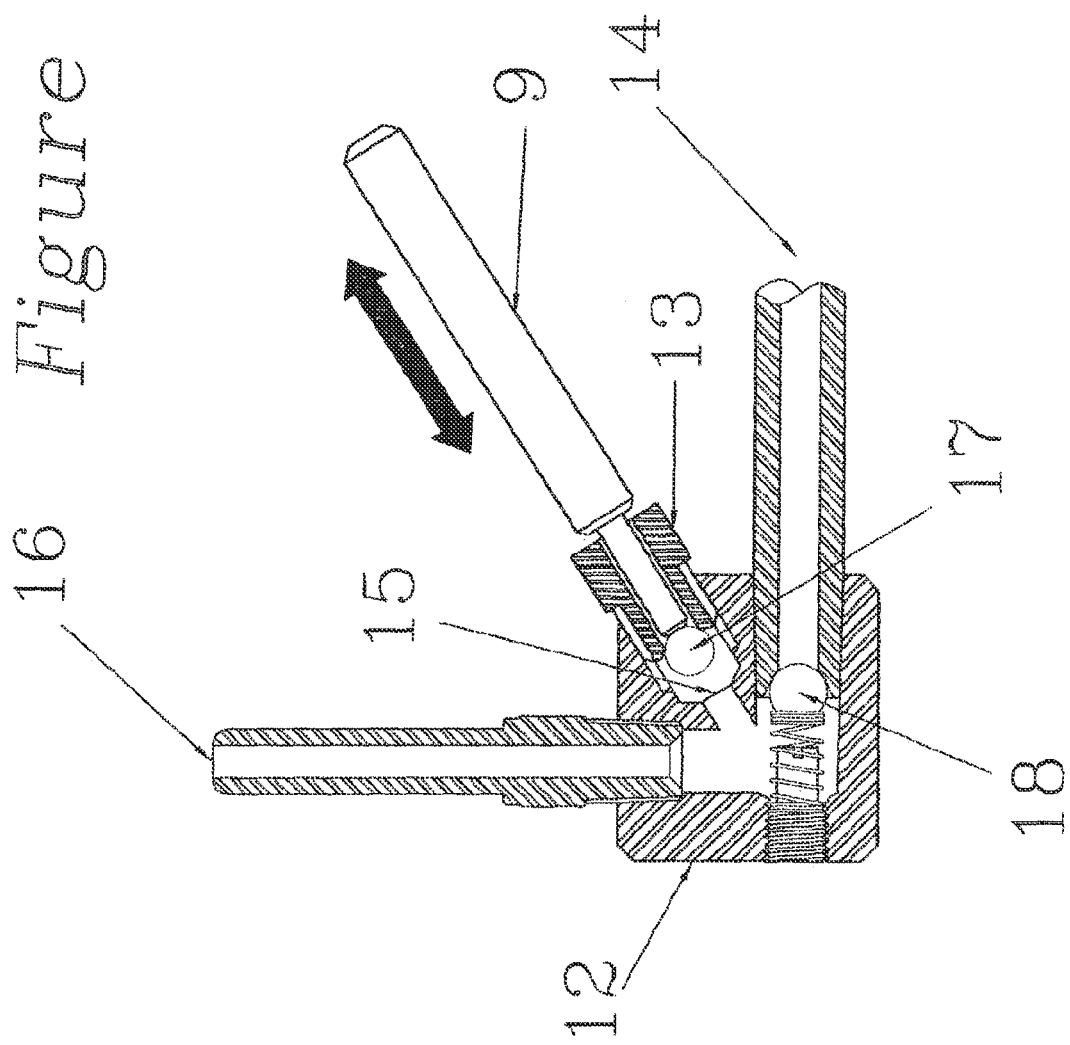

LUBRICATING GREASE RETURN VALVE

TECHNICAL FIELD OF THE INVENTION

This invention relates to a valve for returning grease under pressure from the delivery line of grease guns or similar pressure delivery devices to a reservoir.

BACKGROUND ART

There are a number of different types of grease guns used for the displacing of highly viscous products to a desired location at high pressures. Very often the delivery line of these units consists of a flexible hose to allow for ease of access to all greasing points. In the case were high pressure is required to overcome a high resistance due to tight tolerances inherent in bush type assemblies or blockages within the grease nipple, a swelling of the flexible hose occurs with the increase in pressure. At the end of the greasing cycle the pressure in the delivery line drops from the high pressure required for greasing to atmospheric pressure on disconnecting the grease coupler from the grease nipple. The result is that the delivery hose that absorbed extra grease as it ballooned under the higher pressure now dispels this volume to waste as it returns to its normal size under atmospheric pressure. This waste grease is also greatly compounded by the fact that there are almost always small air pockets trapped within the grease which become compressed as the pressure in the hose rises during the greasing cycle. As the delivery line is released from the grease nipple the air pockets increase volumetrically as they expand to atmospheric pressure displacing still more grease out the end of the delivery line resulting in additional waste grease. This waste increases grease consumption, becomes a fire hazard when left on machinery and becomes an environmental hazard when dropped onto the ground and allowed to enter water systems. By being able to relieve the grease under pressure in the delivery line on completion of the greasing cycle back into a predetermined reservoir a significant reduction in waste grease can be achieved, thereby creating a cost effective and environmentally friendly greasing system.

Another common feature in greasing systems is the use of a coupler known in the art as the Zerk grease coupler. This coupler allows for a high pressure connection between the grease delivery line and the greasing point (the grease nipple). A common feature of the Zerk grease coupler is that it is designed such that the pressure generated within the delivery line assists with the gripping of the grease coupler to the grease nipple. Therefore the higher the pressure generated within the delivery line the higher the force with which the coupler grips the grease nipple. In the case where the greasing cycle is complete and there remains a pressure within the delivery line the operator will need to vigorously oscillate the coupler relative to the grease nipple to cause a by-pass of grease and allow for a pressure drop in the delivery line and in turn enable the coupler to release the grease nipple. In this process the coupler and the nipple are inclined to become damaged in time as well as generating waste grease every time the pressure is relieved at the grease nipple in such a manner. With the inclusion of a pressure relief valve, on completion of the greasing cycle the pressure within the delivery line may be relieved either manually or automatically back into the grease reservoir and the coupler can be removed with ease. By using this methodology the life of both the coupler and nipples will be extended as well as a reduction in waste grease will be achieve. These positive outcomes will be directly responsible for a reduction in greasing costs.

Trials have shown that due to the benefits of this invention dramatic reductions in the waste of grease can be achieved. Furthermore the longevity of both grease couplers and grease nipples are increased significantly. Cumulatively these savings are very significant as millions upon millions of greasing cycles are completed globally every day.

DISCLOSURE OF THE INVENTION

According to the invention there is provided an apparatus for the relief of grease under pressure within the delivery line of a grease gun or similar displacement mechanism which comprises a three-port valve body located prior to the delivery line, the valve body including a pressure inlet port, a delivery port to which the delivery line is attached and a pressure relief port, which discharges to a reservoir, located between them; the pressure relief port including a one way flow control valve mountable therein and activation means for the one way flow control valve; wherein the one way flow control valve is maintained in a closed position by the pressure of grease within the three-port valve body and is activated to be opened when required thereby allowing the delivery line pressure to reduce to atmospheric pressure as grease is released back into the grease reservoir.

All three ports are interlinked via three elongate passages. The relief port is located between the delivery port and pressure inlet port. A one-way check valve in the pressure inlet port allows for the viscous substance to only flow in the delivery direction and inhibits any flow in the opposite direction. The one way flow control valve is located within the pressure relief port which remains completely sealed with any pressure generated beyond the pressure inlet check valve. In other words it is a positive seal. The delivery port allows for some form of delivery line to be attached to the body of the apparatus thereby allowing the viscous substance to be delivered to its desired location.

In the preferred form of the invention, the one way flow control valve comprises a valve ball and a valve seat, the pressure of the grease within the valve body exerts pressure on the valve ball and maintains it in sealing contact with the valve seat. The valve seat is preferably mounted in the valve port by screwing it in, the two being correspondingly screw-threaded for this purpose.

Also in the preferred form of the invention, the valve seat comprises a body having an elongated internal passage of diameter smaller than that of the valve ball. An activation rod is provided which comprises a stepped shaft with the smaller end thereof slidably located within the internal passage of the valve seat. This smaller diameter end is dimensioned to permit passage of grease there past into the grease reservoir. The opposite end with a larger diameter (for practical purposes) is positioned to allow for a mechanical driver to engage the shaft thereby advancing the valve ball off the valve seat.

The activation rod 11 (FIG. 1) is loosely located within the valve seat passage and is supported by a retaining formation which retains the activation rod within the valve seat passage and maintains the rods alignment with the mechanical driver element. The mechanical driver element is preferably a formation on some form of lever or treadle which has the ability to rotate and thereby allowing the driver element to engage the activation rod and thereby opening the one way flow control valve.

To operate the invention the activation rod needs to be displaced in order for it to advance the ball of the one way flow control valve off the valve seat. This allows the free flow of grease through the elongate passage of the one way flow control valve seat, past the loosely fitting activating rod, back into the grease reservoir.

In the first instance this may be achieved manually. It follows that in any manual grease gun the activating handle or treadle will be outside of the grease reservoir while the pumping mechanism will be within the reservoir of grease. The external movement of the treadle or handle is transferred to within the grease reservoir where a driving element is fixed in an appropriate position relative to the activation rod. Thus by raising the handle or treadle at the end of the greasing cycle while there is still residual pressure within the delivery line the movement is carried through to the activation rod and in turn advances the relief valve ball off the relief valve seat thereby allowing grease under pressure within the delivery line to return to the reservoir. Other mechanical means of opening this valve such as cams and levers can be devised.

In the second instance the one way flow control valve may be opened automatically. As in the example above at the end of a greasing cycle with the return springs having pulled the pump (and its linkage) to its extreme position on the inlet stroke, the activating rod can be lengthen such that the one way flow control valve ball is already advanced off the valve seat in this position. It therefore follows that the pressure in the delivery line is automatically relieved at the end of each cycle.

In the third instance the activating rod may be advanced to open the relief valve by an external power source triggered by the operator. This could take the form of electrical, hydraulic or pneumatic means.

It must be noted that the one way flow control valve is not a pressure sensitive valve but operator controlled irrespective of the delivery line pressure. Once the activation force has been released from the activation rod the one way flow control valve ball will remain in the open position until such time that further pressure is introduced via the pressure inlet port. Due to the viscous nature of the material being pumped and the limited tolerances between the port and the ball, the one way flow control valve ball is carried to the valve seat in as soon as pumping starts, thereby preventing grease from returning to the reservoir as the pressure increases.

BRIEF DESCRIPTION OF THE DRAWINGS

The preferred embodiment of the invention is described below with reference to the accompanying drawings in which:

FIG. 2: shows the one way flow control valve assembly including inlet, outlet and pressure relief porting. The grease gun's delivery check valve and one way flow control valve are both shown in the fully closed position. Arrows depict the movement required by the activation rod to allow for the one way flow control valve ball to be moved from its seat allowing grease under pressure to be relieved from the system back to the reservoir.

DETAILED DESCRIPTION OF THE PREFERRED EMBODIMENT

Figure 1:
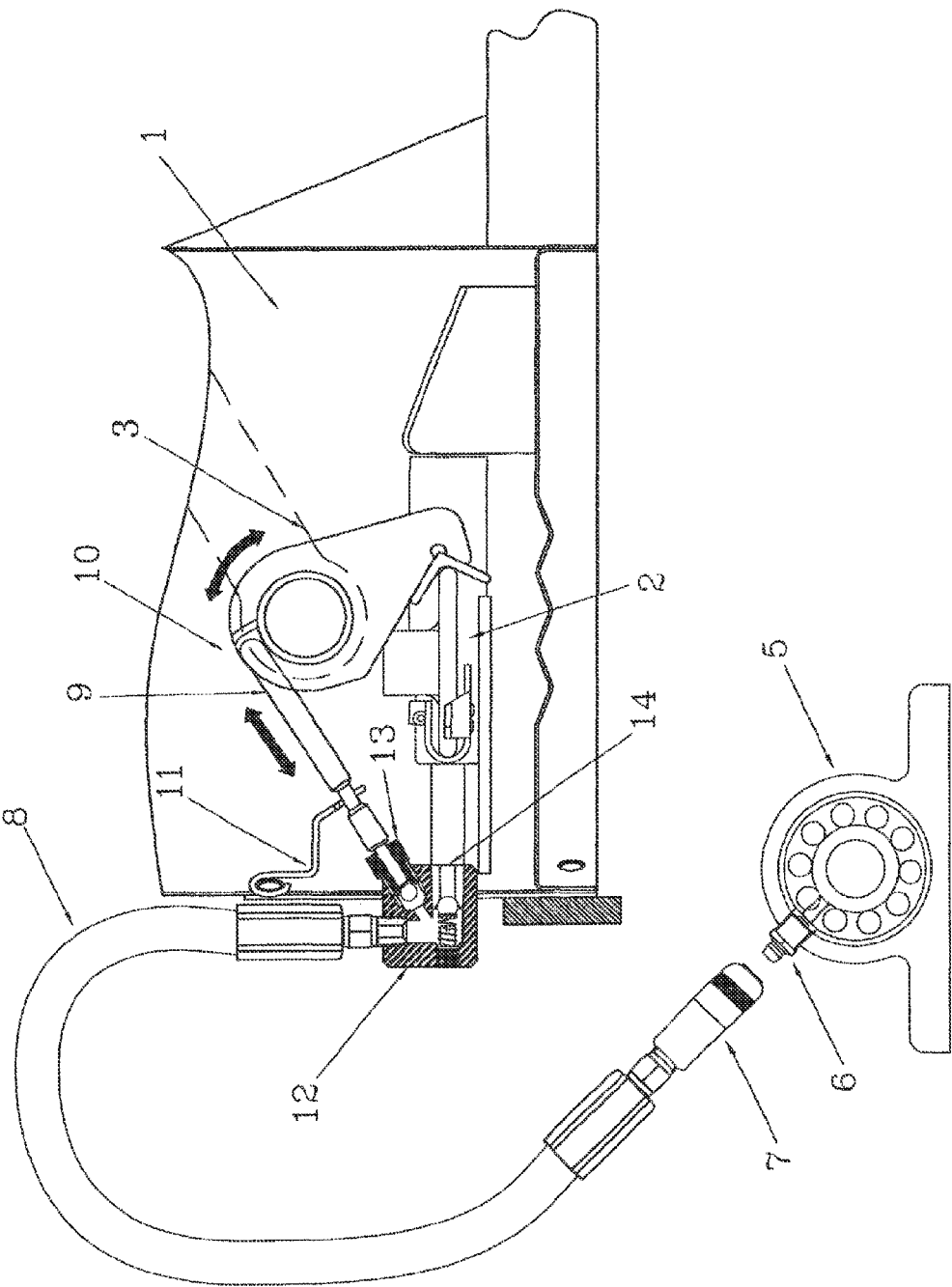
FIG. 1: shows a cross-sectional view of the greasing system incorporating the grease pump, reservoir, one way flow control valve, delivery line, grease coupler and grease nipple. The manual or automatic control lever/treadle is also shown with arrows depicting rotation of the controlling arms and the movement of the activation rod.

Referring to the drawings, the apparatus for relieving grease under pressure in the delivery line is detailed. It must be noted that in order to clearly depict the application and relevance of the one way flow control valve a number of extra components are included in the figures which do not necessarily relate directly to the patent. For example, the bearing/bush, grease nipple and grease coupler depicted in FIG. 1.

Referring to FIGS. 1 & 2, when the operator initiates the first delivery stroke on the grease pump, 2, the grease passes at pressure into the apparatus 12 through the inlet pressure port, 14. The delivery check valve, 18, allows only one directional flow of grease from the inlet port into the apparatus, 12. The pressure generated within the apparatus ensures that the one way flow control valve ball, 17, forms a positive seal against the valve seat, 13. Due to the highly viscous nature of grease no retaining spring is required for the valve ball 17. The slightest flow of grease carries the valve ball 17 towards the valve seat 13 and forms an efficient seal in an instant.

On further stroking of the grease pump whether it is by manual or mechanical means the grease has no option but to pass through the delivery port, 16, and in turn down the delivery line, 8 as the one way flow control valve ball 17 is firmly seated in the valve seat 13, closing the valve.

When the grease coupler, 7 and grease nipple, 6 are engaged and while the grease pump is been stroked the grease travels through to the bearing/bush, 5, which requires the grease. In the instance where there are tight tolerances within the bearing/bush or there is a blockage in the grease nipple a substantial pressure can remain within the delivery line, 8. Without allowing this pressure to dissipate (and due to the design of the Zerk grease coupler) it becomes very difficult to part the grease coupler and the grease nipple as the higher the pressure in the delivery line the higher the force with which the grease coupler grips the grease nipple. In such a case, when the grease coupler is forced off the nipple grease flows to waste from the end of the delivery line (as the ballooned hose returns to size and any air pockets within the grease increase in volume and force further grease out the end of the delivery line). Removing the grease coupler while under pressure has a distinctly negative effect on its service life and there is a high probability that the either the grease coupler or grease nipple will, in time, become damaged.

To avert this scenario the operator is required to activate the activation rod, 9, via the manual or automatic lever/treadle, 3. The lever includes a mechanical driver 10 which engages the top of the activation rod 9 and advances it. The activation rod displaces the one way flow control valve ball, 17, thereby breaking the positive seal between the ball 17 and the valve seat, 13. The pressurized grease within the apparatus and the delivery line is now relieved past the relief port check valve and activation rod back into the grease reservoir, 1. The diameter of the activation rod which protrudes into the elongate passage within the valve seat, 13, needs to be smaller than the diameter of the elongate passage to a degree that allows for sufficient grease to bypass the rod on operation. The one way flow control valve will then remain open.

With the initiation of a new greasing cycle the initial pressure generated within the apparatus carries the one way flow control valve ball, 17, and the activation rod, 9, in unison in the upward direction until a positive seal is generated by the valve ball, 17, and the valve seat, 13.

The invention claimed is:

1. An apparatus for the return of grease under pressure within a manually operated grease gun to the grease gun reservoir, the apparatus comprising:
   a lever;
   a grease gun reservoir;
   a grease pump connected to the grease gun reservoir and to the lever, the grease pump manually operated by the lever to manually pump grease from the grease reservoir to an outlet of the grease pump;
   a delivery line, the delivery line being a flexible hose;
   a three-port valve body,
   wherein the three-port valve body includes
   i) a pressure inlet port connected to the outlet of the grease pump,
   ii) a delivery port connected to discharge the grease to an inlet of the flexible hose of the delivery line and
   iii) a pressure relief port located between the pressure inlet port and the delivery port,
   wherein the pressure relief port includes a one way flow control valve mounted therein and an activation means for the one way flow control valve, the activation means connected to the lever,
   wherein the one way flow control valve is maintained in a closed position by pressure of the grease within the three-port valve body and is manually activatable, by the activation means, to be opened when required;
   an elongated passage that links the relief port to the grease gun reservoir, the elongated passage providing a path for the grease under pressure to be returned to the grease gun reservoir on activation of the one way flow control valve, thereby allowing a pressure in the delivery line to reduce to atmospheric pressure,
   wherein the lever manually activates the activation means to displace the one way flow control valve from the closed position to thereby open the relief port to the grease gun reservoir and return the grease, under pressure, from the three-port valve body to the grease gun reservoir and allow the pressure in the delivery line to reduce to the atmospheric pressure.

2. The apparatus for the return of grease under pressure according to claim 1, wherein the three-port valve body further comprises a delivery check valve at the high pressure inlet port, and the one way flow control valve is located within the pressure relief port which remains completely sealed with any pressure generated beyond the delivery check valve, a seal between the one way flow control valve and the relief port being a positive seal.

3. The apparatus for the return of grease under pressure according to claim 2, wherein the one way flow control valve remains effectively closed by the pressure of the grease within the valve body during operation.

4. The apparatus for the return of grease under pressure according to claim 1,
   wherein the one way flow control valve remains effectively closed by the pressure of the grease within the valve body during operation, and
   wherein the activation means comprises an activation rod extending into the elongated passage, the lever manually activating the activation rod to displace the one way flow control valve from the closed position, into three-port valve body, to thereby open the relief port to the grease gun reservoir and return the grease, under pressure, from the three-port valve body to the grease gun reservoir and allow the pressure in the delivery line to reduce to the atmospheric pressure.

5. The apparatus for the return of grease under pressure according to claim 4, wherein the activation rod comprises a shaft with a smaller diameter end thereof being slidably located within the elongated passage that connects the three port valve body to the grease reservoir.

6. The apparatus for the return of grease under pressure according to claim 5, wherein a larger diameter end of the activation rod is located in the proximity of a mechanical driver to force the one way flow control valve into an open position.

7. The apparatus for the return of grease under pressure according to claim 6, wherein the activation rod is loosely located within the valve seat passage and is supported by a retaining formation which retains the activation rod within the valve seat passage and maintains the rod's alignment with the mechanical driver.

8. The apparatus for the return of grease under pressure according to claim 6, wherein,
   the lever is a rotating lever, and
   the mechanical driver comprises a formation associated with the rotating lever, permitting engagement of the mechanical driver and the activation rod, which in turn opens the one way flow control valve manually as and when required.

9. The apparatus for the return of grease under pressure according to claim 8, in which the smaller diameter end of the activation rod is dimensioned to permit grease to bypass the rod within the elongated passage and return to the grease reservoir.

10. The apparatus for the return of grease under pressure according to claim 6, in which the smaller diameter end of the activation rod is dimensioned to permit grease to bypass the rod within the elongated passage and return to the grease reservoir.

11. The apparatus for the return of grease under pressure according to claim 5, in which the smaller diameter end of the activation rod is dimensioned to permit grease to bypass the rod within the elongated passage and return to the grease reservoir.

12. An apparatus for the return of grease under pressure from within the delivery line of a manually operated grease gun to the grease gun reservoir, the apparatus comprising:
   a grease gun reservoir;
   a delivery line;
   a three-port valve body located prior to the delivery line, wherein the three-port valve body includes
   i) a pressure inlet port,
   ii) a delivery port to which the delivery line is attached and
   iii) a pressure relief port located between the pressure inlet port and the delivery port,
   wherein the pressure relief port includes a one way flow control valve mounted therein and an activation means for the one way flow control valve,
   wherein the one way flow control valve is maintained in a closed position by pressure of grease within the three-port valve body and is manually activatable to be opened when required; and
   an elongated passage that links the relief port to the grease gun reservoir, the elongated passage providing a path for the grease under pressure to be returned to the grease gun reservoir on activation of the one way flow control valve, thereby allowing a pressure in the delivery line to reduce to atmospheric pressure.

13. The apparatus for the return of grease under pressure according to claim 12, wherein the one way flow control valve is located within the pressure relief port which remains completely sealed with any pressure generated beyond the delivery check valve, a seal between the one way flow control valve and the relief port being a positive seal.

14. The apparatus for the return of grease under pressure according to claim 13, wherein the one way flow control valve remains effectively closed by the pressure of the grease within the valve body during operation.

15. The apparatus for the return of grease under pressure according to claim 12, wherein the one way flow control valve remains effectively closed by the pressure of the grease within the valve body during operation.

16. The apparatus for the return of grease under pressure according to claim 12, further comprising an activation rod comprising a smaller diameter end and a larger diameter end, the smaller diameter end of the rod being slidably located within the elongated passage that connects the three port valve body to the grease reservoir.

17. The apparatus for the return of grease under pressure according to claim 16, wherein the larger diameter end of the activation rod is located in the proximity of a mechanical driver to force the one way flow control valve into an open position.

18. The apparatus for the return of grease under pressure according to claim 17, wherein the activation rod is loosely located within the valve seat passage and is supported by a retaining formation which retains the activation rod within the valve seat passage and maintains the rod's alignment with the mechanical driver.

19. The apparatus for the return of grease under pressure according to claim 16, in which the smaller diameter end of the activation rod is dimensioned to permit grease to bypass the rod within the elongated passage and return to the grease reservoir.

20. The apparatus for the return of grease under pressure according to claim 19, wherein the mechanical driver comprises a formation associated with a rotating lever/treadle, permitting engagement of the mechanical driver and the activation rod, which in turn opens the one way flow control valve manually as and when required.

\* \* \* \* \*